United States Patent
Schmid

(10) Patent No.: US 8,353,221 B2
(45) Date of Patent: Jan. 15, 2013

(54) MASS FLOW METER

(75) Inventor: Felix Ernst Schmid, Brig (CH)

(73) Assignee: Meggit S.A., Fribourg (CH)

(*) Notice: Subject to any disclaimer, the term of this patent is extended or adjusted under 35 U.S.C. 154(b) by 76 days.

(21) Appl. No.: 13/010,560

(22) Filed: Jan. 20, 2011

(65) Prior Publication Data

US 2012/0186361 A1    Jul. 26, 2012

(51) Int. Cl.
*G01F 15/00* (2006.01)
(52) U.S. Cl. .................................. 73/861.77
(58) Field of Classification Search .............. 76/861, 76/861.353, 861.352, 861.77, 861.84, 861.75, 76/861.76
See application file for complete search history.

(56) References Cited

U.S. PATENT DOCUMENTS

| | | | |
|---|---|---|---|
| 3,036,461 A * | 5/1962 | Baranowski, Jr. ....... | 73/861.353 |
| 3,538,767 A | 11/1970 | Pustel et al. | |
| 3,613,451 A | 10/1971 | Scott | |
| 3,807,229 A * | 4/1974 | Chiles ............. | 73/203 |
| 3,877,304 A | 4/1975 | Vetsch | |
| 3,958,447 A * | 5/1976 | Baker et al. .......... | 73/32 R |
| 4,012,957 A | 3/1977 | Chiles et al. | |
| 4,056,976 A | 11/1977 | Hildebrand et al. | |
| 4,438,648 A * | 3/1984 | Cheney, Jr. ............ | 73/195 |
| 4,534,226 A * | 8/1985 | Rose ................ | 73/861.84 |
| 5,363,699 A * | 11/1994 | McCall .............. | 73/198 |
| 5,370,001 A * | 12/1994 | LaBrecque et al. ...... | 73/861.353 |
| 5,583,302 A | 12/1996 | Perrin | |
| 5,728,950 A | 3/1998 | Boulanger | |
| 6,776,055 B2 * | 8/2004 | Burton et al. .......... | 73/861.77 |
| 2009/0049927 A1 | 2/2009 | Spivak et al. | |
| 2010/0018326 A1 | 1/2010 | Lin et al. | |
| 2011/0167927 A1* | 7/2011 | Healey ............. | 73/861.353 |

FOREIGN PATENT DOCUMENTS

| | | |
|---|---|---|
| GB | 717897 A | 11/1954 |
| GB | 1366551 A | 9/1974 |
| WO | WO-8101052 A1 | 4/1981 |
| WO | WO-8101053 A1 | 4/1981 |

\* cited by examiner

*Primary Examiner* — Jewel V Thompson
(74) *Attorney, Agent, or Firm* — Dickstein Shapiro LLP

(57) ABSTRACT

A mass flow meter comprising a housing including a fluid inlet and a fluid outlet. The housing defines a chamber and a rotatable member is arranged in the chamber so as to be rotatable about an axis. A momentum device is also arranged in the chamber and connected to the rotatable member via a biasing element so as to be rotatable about the axis and rotatable relative to the rotatable member. A fluid path in fluid communication with the fluid inlet and the fluid outlet is provided. The fluid path passes through both the rotatable member and the momentum device. The fluid path enters the momentum device at a radial distance r1 from the axis and exits the momentum device at a different radial distance r2 from the axis. A torque provider may be coupled to the rotatable member via a shaft or gear member.

34 Claims, 5 Drawing Sheets

MASS FLOW METER

FIELD

The present patent document relates to improved designs for a mass flow meter.

BACKGROUND

The classic angular momentum flow meter has four major components: a main shaft that may be rotated by a turbine or a motor; a stationary flow straightener; an impeller (momentum wheel); and a speed wheel drum. During operation, the fluid flows through the turbine which causes the turbine to rotate. The turbine is connected to the shaft and therefore the shaft rotates in unison with the turbine.

Next, the fluid passes through a stationary flow straightener. The stationary flow straightener is not coupled to the shaft or the turbine. The purpose of the flow straightener is to remove as much of the angular momentum from the fluid as possible because unaccounted for angular momentum will cause an error in the measurement. For example, turbulence or swirl may be introduced into the fluid by any number of elements including bends in the pipe in which the fluid travels or the turbine. The flow straighteners help remove turbulence and swirl. Ideally, as the fluid exits the stationary flow straightener, all angular momentum with respect to the rotational axis of the flow meter has been removed.

Finally, the fluid passes through the impeller and drum. Typically, the impeller is located inside the drum to form a measurement assembly. The drum forms an outer enclosure of the measurement assembly and the impeller is located on the interior of the drum. Both the impeller and the drum are in rotation about the axis. However, the drum and the impeller are connected to the flow meter in different ways. The drum is rigidly affixed to the shaft such that the drum is forced to rotate in unison with the turbine and the shaft. The impeller, is attached to a rotating member of the flow meter, for example the shaft or the drum, by a spring element, such as a torsional spring.

The fluid, which ideally exits the flow straightener with no angular momentum with respect to the shaft, enters the impeller and the drum. The impeller and the drum are rotating with the same speed as the shaft. Consequently, the fluid is accelerated to match the rotation of the impeller and the drum. However, because the impeller is attached to the shaft or other rotating member of the flow meter via a spring, the impeller is caused to lag behind the drum. The forced rotation of the impeller changes the rotational velocity of the fluid as it passes through and increases the fluid's angular momentum. The increase in angular momentum of the fluid can be measured by calibrating the spring connecting the impeller to the shaft to obtain the torque required to force the impeller to rotate as the fluid passes through. The equation for torque is:

$$T = \dot{m} * \omega * r^2$$

Where: T=torque; $\dot{m}$=mass flow rate; $\omega$=angular velocity; and r=radius of gyration of the mass flow.

One method of measuring the torque via the spring is to measure the lag of the impeller with respect to the drum as they both rotate around the axis of the shaft. Although both the drum and the impeller will tend to rotate at the same velocity, the torque imparted by the fluid on the impeller will cause the spring to deflect resulting in the impeller lagging the drum as they both rotate around with the shaft. The lag may be measured and from which the torque required to be imparted on the impeller to increase the fluid's angular momentum may be calculated.

A common method of measuring the lag between the impeller and the drum is to place a magnet on the outside of both the impeller and the drum. Stationary wire coils may then be positioned so that they come in close proximity to the magnets as the impeller and drum rotate. The rotating magnets will induce a small electric pulse in the electric coils each time they pass. The electric pulse can be detected by electronic circuitry and the lag in phase determined based on when the magnet associated with the drum and when the magnet associated with the impeller pass by their respective coils. The lag can be used to calculate the torque based on the spring constant. For any given spring constant, the smaller the phase shift the less torque required to rotate the impeller through the fluid. In contrast, the larger the phase shift the more torque that is required to rotate the impeller through the fluid. The torque required to change the angular momentum of the fluid can then be translated into the mass flow rate of the fluid. The time $\Delta t$ between two pulses due to a phase lag or lag angle $\zeta$ is $$\Delta t = \frac{\zeta}{\omega}$$

where $$\zeta = \frac{T}{c} = \frac{\dot{m} * \omega * r^2}{c}$$

and c is the spring constant. Substituting for $\zeta$ gives $$\Delta t = \frac{r^2}{c} * \dot{m}$$

or $\Delta t = k * \dot{m}$ which shows $\Delta t$ becomes directly proportional to $\dot{m}$.

The above described design uses the principles of conservation of momentum to measure the mass flow rate of the fluid traveling through the flow meter. Ideally, the fluid leaves the flow straightener with no rotation about the central axis of the flow meter. As the fluid passes through the impeller and drum (or measurement assembly), the fluid is accelerated to rotate about the central axis of the flow meter. Because of the physics of conservation, the amount of energy that is required to increase the rotation of the fluid around the axis of the flow meter may be translated into the mass flow of the fluid passing through the flow meter.

Although the above described flow meter design can measure the mass flow rate of a fluid passing through, a number of errors that affect the accuracy of the device are inherent in its design. For example, as the fluid passes from the flow straightener into the impeller and drum assembly, the fluid passes through a shearing plane created by the difference in angular velocity of the rotating impeller and the stationary flow straightener. The shearing force created at the shearing plane is a frictional force that increases the amount of energy needed to rotate the liquid with the impeller. If the shearing force is constant, it may be factored out of the calculations and the mass-flow rate may be determined relatively accurately. However, the shearing force is dependent on the viscosity of the liquid which may change with temperature or from one fluid to another. Even similar types of fluid from different locations or suppliers, like for example Kerosene for jet engines, may have different viscosities. Therefore, the shearing force may vary with both the kind of fluid passing through the flow meter and the temperature of the fluid flowing through the flow meter. The varying shear force creates an error in the mass flow calculation that is difficult to account for. A large variable shearing force can prevent the mass flow meter from making accurate measurements.

Furthermore, it may be difficult to remove or reduce the shearing force with current designs. In order to obtain a large measuring torque to maximize the accuracy of the flow meter, the angular momentum added to the fluid should be maximized. In order to maximize the angular momentum added to the fluid as it pass through the flow meter, the distance between the fluid flow path and the rotational axis of the flow meter should be maximized. Maximizing the distance from the rotational axis to the flow path also increases the error causing torque caused by the shearing forces because the length of the torque arm is increased. This complicates the process of trying to minimize the measurement error in current mass flow meter designs.

SUMMARY

In view of the foregoing, an object according to one aspect of the present patent document is to provide an improved mass flow meter. Preferably the improved designs address, or at least ameliorate one or more of the problems described above. To this end, a mass flow meter is provided. In one embodiment, the mass flow meter comprises a housing including a fluid inlet and a fluid outlet, wherein the housing defines a chamber therein; a rotatable member arranged in the chamber and rotatable about an axis; a momentum device arranged in the chamber and connected to the rotatable member via a biasing element so as to be rotatable about the axis and rotatable relative to the rotatable member; and a fluid path in fluid communication with the fluid inlet and the fluid outlet, wherein the fluid path passes through both the rotatable member and the momentum device, and wherein the fluid path enters the momentum device at a radial distance $r1$ from the axis and exits the momentum device at a radial distance $r2$ from the axis, and wherein $r1$ and $r2$ are different distances.

In another embodiment, the mass flow meter further comprises a second momentum device arranged in the chamber that is also connected to the rotatable member via a biasing element so as to be rotatable about the axis and rotatable relative to the rotatable member. In this embodiment the fluid path also passes through the second momentum device and enters the second momentum device at a radial distance $r3$ from the axis and exits the second momentum device at a radial distance $r4$ from the axis, wherein $r3$ and $r4$ are different distances. In some embodiments that include more than one momentum device, the change in the radial distance between the entry radius $r1$ and the exit radius $r2$ of the first momentum device is substantially equal in magnitude and opposite in direction to the change in the radial distance between the entry radius $r3$ and the exit radius $r4$ of the second momentum device.

In yet another embodiment, the mass flow meter further comprises a flow straightener interposed in the fluid path between the inlet and the momentum device in the chamber. Moreover, a portion of the fluid path between the fluid inlet and the momentum device may defined by the flow straightener. In some embodiments, the flow straightener is designed to be in fixed rotation with the rotatable member. In other embodiments the flow straighteners may be stationary. In yet another embodiment, the flow straightener may be formed integral with the rotatable member.

In certain embodiments, a second chamber is defined within the rotatable member and the momentum device is contained within the second chamber. The second chamber may be sealed or unsealed with respect to the rest of the flow meter.

The components of the mass flow meter in fixed rotation may be driven in any number of ways. In one embodiment, a torque provider is coupled to the rotatable member. In certain embodiments, a rotatable shaft that runs along the axis is provided to operatively couple the rotatable member to a torque provider, such as a turbine or a motor (electric or gas).

In some embodiments, the biasing element is a torsional spring. In one embodiment, the torsional spring is arranged between the momentum device and the shaft so that the biasing element indirectly connects the momentum device to the rotatable member through the shaft. In other embodiments, the biasing element may directly connect the momentum device to the rotatable member.

Preferably, a sensor is operatively arranged to measure the deflection of the biasing element. In some embodiments, the sensor measures the deflection of the biasing element by determining a phase difference between the rotation of the momentum device and the rotation of the rotatable member. In another embodiment, the sensor is further arranged to also measure the angular speed of the momentum device. In yet another embodiment, the sensor directly measures the torque between the rotatable member and the momentum device.

In different embodiments the flow path through the flow meter may take on different shapes. In one embodiment, the entry radius $r1$ of the flow path as it enters the momentum device is smaller than the exit radius $r2$ as it leaves the momentum device.

In another embodiment, the direction of the flow path is substantially reversed within the momentum device. In certain embodiments where the flow path is reversed within the momentum device, the fluid enters and exits the flow meter on the same side. In other embodiments, the fluid may enter and exit the flow meter on adjacent sides.

In a preferred embodiment, the momentum device and other internal components are designed to rotate around an axis however, in other embodiments the rotatable member and the momentum device are designed to be dithered back and forth by the torque provider.

In yet another embodiment, a mass flow meter is provided comprising a housing defining a chamber therein, the housing having a fluid inlet and a fluid outlet; a rotatable member arranged in the chamber to be rotatable about an axis; a momentum device arranged in the chamber and connected to the rotatable member via a biasing element so as to be rotatable about the axis and rotatable relative to the rotatable member; and a fluid path passing through the housing from the fluid inlet to the fluid outlet, wherein the fluid path includes a first portion defined within the momentum device and a second portion defined within the rotatable member, and wherein the first portion has a fluid entry at a radial distance $r1$ from the axis and a fluid exit at a radial distance $r2$ from the axis, and wherein $r1$ and $r2$ are different distances.

In yet another embodiment, a mass flow meter is provided that comprises a housing including a fluid inlet and fluid outlet, wherein the housing defines a chamber therein; a fluid path from the fluid inlet to the fluid outlet; a rotatable member arranged in the chamber and rotatable about an axis; a momentum device arranged in the chamber and connected to the rotatable member via a biasing element so as to be rotatable about the axis and rotatable relative to the rotatable member wherein the fluid path traverses the momentum device from a fluid entry to a fluid exit; and wherein the mass flow meter is designed to remove a shear plane at the fluid entry and fluid exit when the momentum device and rotatable member are rotated about the axis.

In another embodiment, a mass flow meter is provide that comprises a housing including a fluid inlet and a fluid outlet, wherein the housing defines a chamber therein; a rotatable member arranged in the chamber and rotatable about an axis; a momentum device arranged in the chamber and connected to the rotatable member via a biasing element so as to be rotatable about the axis and rotatable relative to the rotatable member; and a fluid path in fluid communication with the fluid inlet and the fluid outlet, wherein the fluid path enters the momentum device at a radial distance r1 from the axis and exits the momentum device at a radial distance r2 from the axis, and wherein r1 and r2 are different distances, and wherein the direction of the fluid path is substantially reversed within the momentum device.

In yet another embodiment, a mass flow meter is provided that comprises a rotatable member arranged to be rotatable about an axis; a momentum device arranged to be rotatable about the axis and rotatable relative to the rotatable member and in interaction with the rotatable member via an element capable of transmitting a torque between the rotatable member and the momentum device; a fluid path passing through the momentum device wherein the fluid path enters the momentum device at a radial distance r1 from the axis on a first side and exits the momentum device at a radial distance r2 from the axis on the first side, and wherein r1 and r2 are different distances; and a means to determine the angular momentum which the fluid is exerting on the momentum device.

As described more fully below, the flow meters and related processes of the present patent document permit the effective measurement of the mass flow rate of a flowing fluid. Further aspects, objects, desirable features, and advantages of the flow meter and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE PREFERRED EMBODIMENTS

Figure 1:
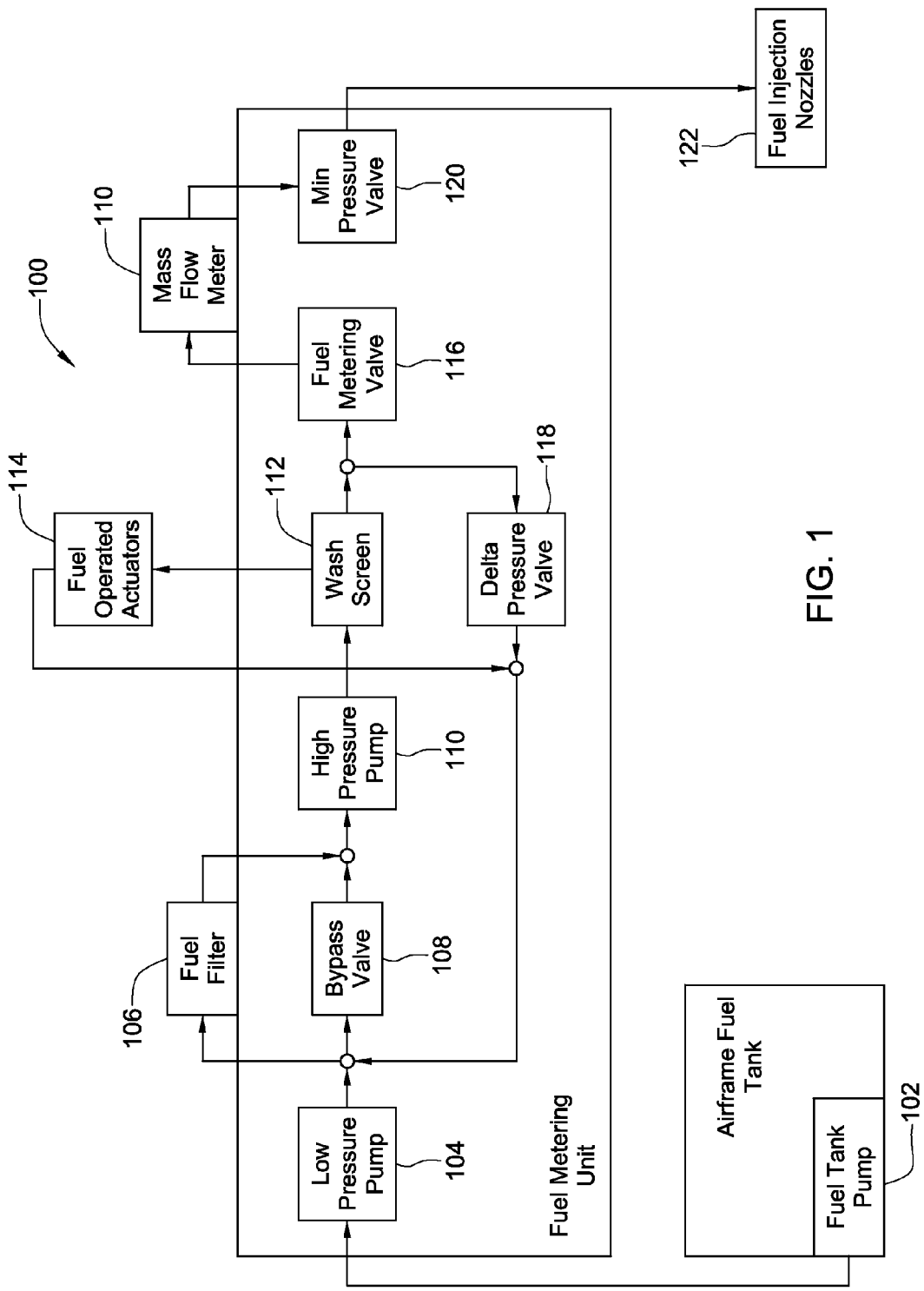
FIG. 1 illustrates an example of a fuel metering unit including a mass flow meter.

FIG. 1 illustrates an example of a fuel metering unit (FMU) 100 including a mass flow meter 110. The FMU 100 of FIG. 1 is just one example of a system in which the embodiments of a mass flow meter 110 described in the present patent document may be used. To this end, embodiments of the mass flow meter 110 described herein may be included in any flow system.

The FMU 100 typically sits on an engine. Fuel is pumped by the fuel tank pump 102 to the FMU 100 on the engine. Once the fuel reaches the FMU 100, the fuel is boosted by a low pressure pump 104 to the fuel filter 106. In some embodiments of the FMU 100, the fuel filter 106 may be placed outside the FMU 100 for easy maintenance access. A bypass valve 108 may be provided in parallel with the fuel filter 108 to allow the fuel filter 106 to be bypassed in case of filter clogging. As the fuel filter 106 becomes clogged the pressure difference across the fuel filter 106 increases. When the pressure difference across the fuel filter 106 rises above the threshold of the bypass valve 108, the bypass valve 108 opens and allows the fuel to flow past the fuel filter 106.

After the fuel passes the fuel filter, a high pressure pump 110 (normally a gear pump) pressurizes the fuel. In the FMU 100 of FIG. 1, the fuel is passed through a wash screen 112. A portion of the fuel flow is diverted to the fuel powered actuators 114 (which may provide for example position control of stator vanes) by the wash screen 112. The wash screen 112 provides a very clean fluid to the fuel powered actuators 114. The fuel that is diverted and passes through the fuel operated actuators 114 is returned back to the fuel filter 106 inlet.

In the main flow direction, the remaining "less clean" fuel goes to the fuel metering valve 116 which regulates the fuel flow for combustion. The delta pressure valve 118 returns the superfluous fuel to the fuel filter 106 inlet. The main fuel flow continues through the mass flow meter 110. In the embodiment shown in FIG. 1 and preferably, the mass flow meter may also be positioned outside the FMU 100. Similar to the position of the fuel filter 106, positioning the mass flow meter 110 outside the FMU 100 allows the mass flow meter 110 to be easily serviced or replaced. After the fuel passes through the mass flow meter 110, the fuel returns into the FMU 100 where a minimum pressure valve 120 is used to maintain a minimum pressure. The fuel then flows to the fuel injection nozzles 122 in the combustion chambers.

Figure 2:
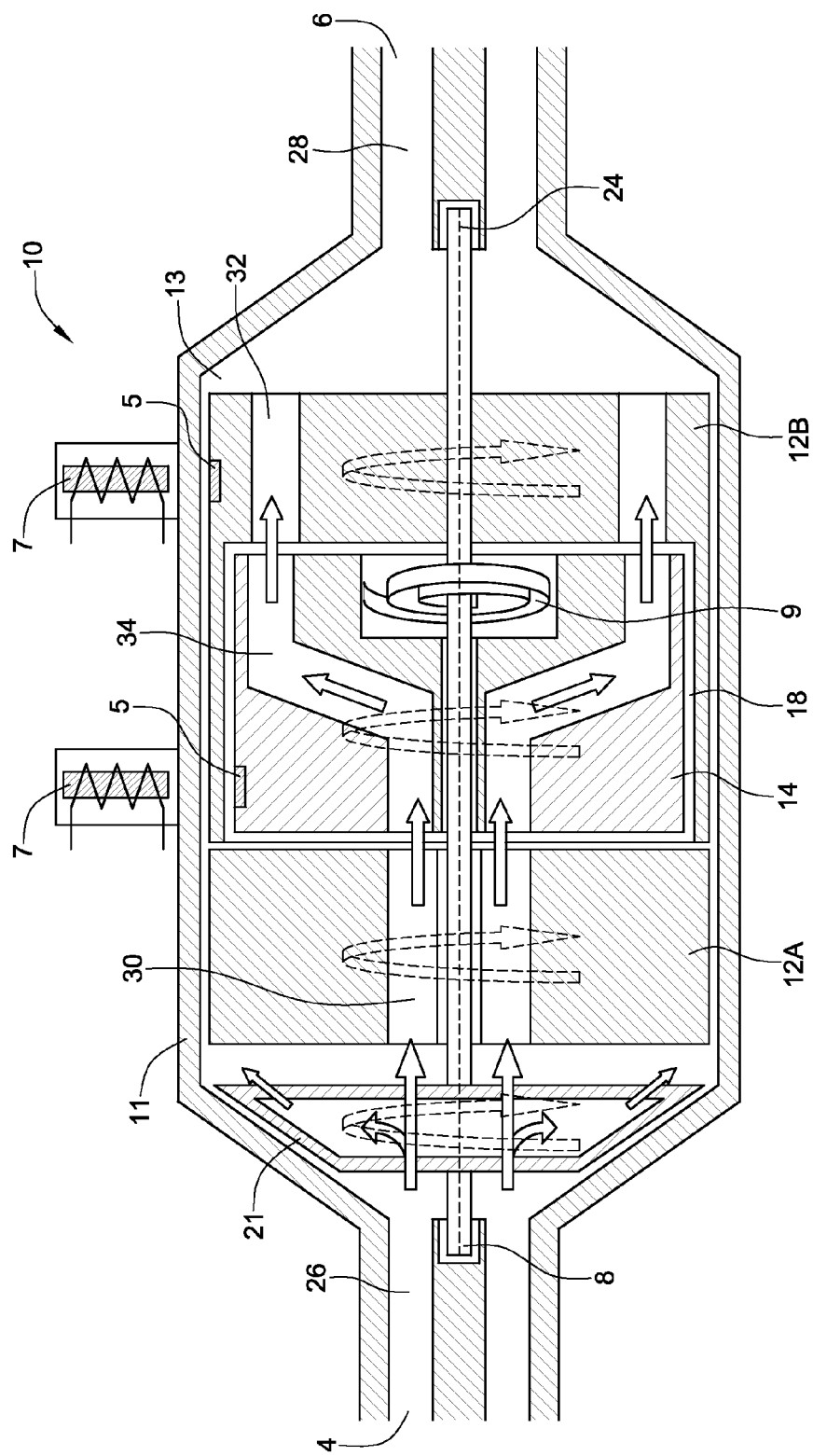
FIG. 2 illustrates a cross sectional view of an embodiment of a rotational flow meter with a single momentum device.

FIG. 2 illustrates a cross sectional view of an embodiment of a rotational flow meter 10 with a single momentum device 14. The flow meter 10 is an embodiment of a flow meter component 110 that may be used in a FMU 100 like the one illustrated in FIG. 1. However, the flow meter 10 is not restricted to an FMU and may be used in any flow system.

The flow meter 10 of FIG. 2 includes a housing 11, rotatable members 12A and 12B, a momentum device 14 and a torque provider 21. In the embodiment shown in FIG. 1, the housing 11 forms a chamber 13 which contains the internal components including rotatable members 12A and 12B, momentum device 14 and torque provider 21. In other embodiments, the housing 11 may contain more or less components.

FIG. 2 illustrates a cross section of the housing 11. The housing 11 has a fluid inlet 4 and a fluid outlet 6. In the preferred embodiment, housing 11 and the chamber 13 defined therein are both cylindrical. A cylindrical chamber 13 facilitates the smooth movement of the internal components in rotation. The housing 11 may be made of any number of pieces in order to make the manufacture and assembly of the flow meter easier. In a preferred embodiment, the housing may be made of two pieces. The first piece may be constructed in the shape of a cylinder, and the second piece may be constructed in the shape of a cap for the cylinder. The cylinder and cap are preferably threaded so that they may screw together to seal and form chamber 13. In a preferred embodiment including a cylinder and cap, the cylinder includes a flange so that the cap may be easily bolted to the cylinder to form the sealed chamber 13. An O-ring may be used between the cap and the cylinder to seal the two pieces of the housing 11.

In other embodiments, other designs of housing 11 may be used. For example, the pieces of the housing 11 may join along a line parallel to the axis of rotation 24 in a clam shell configuration. Other configurations are also possible. Preferably, the housing 11 is made from a minimal number of pieces to reduce the number of seals required. Fewer pieces may also reduce manufacturing costs and increase reliability.

The housing 11 defines a chamber 13 therein. In operation, the flow meter 10 may be subjected to high internal pressures which will be taken up by the housing 11. Consequently, the housing 11 needs to be sealed against external pressure leaks. Mass flow meters may be used in jet engine fuel lines and other extremely high pressure areas and therefore, may be required to withstand high pressures. Pressures in fuel lines may exceed 1,400 pounds per square inch. (psi). Sealing the portions of the housing to form chamber 13 may be done using press fit, threads, an o-ring (not shown) or other commonly used pressure sealing techniques.

The housing 11 may be made from any material appropriate to handle the fluid the flow meter is designed to withstand. Possible materials for the construction of the housing 11 include injection molded plastic, aluminum, and stainless steel to name a few.

As shown in FIG. 2, located within the chamber 13 formed by housing 11 are rotatable members 12A and 12B. A rotatable member is defined herein as any component of the flow meter 10 which includes a portion of the flow path 34 that interfaces with the flow path entrance or exit from the momentum device and is designed to rotate with the same angular speed as the momentum device 14 when the flow meter 10 is operating in a steady state condition.

When the flow meter 10 of FIG. 2 is in operation, the fluid enters the flow meter 10 through the fluid inlet 4. In the embodiment shown in FIG. 2, the torque provider 21 is a turbine and the fluid passes through the turbine which is connected to the shaft 8 running along the axis of rotation 24. As the turbine is caused to rotate by the flowing fluid, the shaft 8 is also caused to rotate. In the embodiment shown in FIG. 2, the flow path 34 passes through rotatable member 12A, momentum device 14, and rotatable member 12B and then the fluid exits the flow meter 10 via the fluid outlet 6.

In the embodiment shown in FIG. 2, rotatable member 12A and 12B are connected to the rotatable shaft 8 and thus rotate with the shaft. Momentum device 14 is also connected to the rotatable shaft 8, however, momentum device 14 is connected to the rotatable shaft via a biasing element 9 (spring). Accordingly, the momentum device 14 will also be caused to rotate with the rotatable shaft 8 as the fluid flows through the flow meter 10, however, the momentum device 14 will lead or lag the rotation of the shaft 8, and the rotatable members 12A and 12B as explained below.

In the embodiment shown in FIG. 2, the flow meter 10 has two rotatable members 12A and 12B. However, in other embodiments, only one rotatable member may be present. For example, in some embodiments one rotatable member, either 12A or 12B, may be stationary and not connected to the rotatable shaft 8 and thus not a rotatable member. In other embodiments, one of the rotatable members, either 12A or 12B, may not be present at all. For example, the flow path 34 may not pass through rotatable member 12B and may exit the momentum device 14 directly into the cavity 13.

As shown in FIG. 2, rotatable members may be embodied in various different shapes. For example, rotatable member 12B is shown in the embodiment of FIG. 2 as a cylinder with a cavity 18 that encloses momentum device 14. Rotatable member 12B may also be referred to as a rotor, drum, or a support device for momentum device 14. In the embodiment shown in FIG. 2, the momentum device 14 is positioned within the cavity 18 of the rotatable member 12B. In the illustrated embodiment, rotatable member 12A acts as a flow conditioner and interfaces with the rotatable member 12B to completely enclose the momentum device 14 in the cavity 18 thus forming a second chamber.

In various embodiments, either rotatable member 12A or 12B may also be used to connect the momentum device 14 to the rotatable shaft 8. For example, the momentum device 14 may be connected to either rotatable member 12A or 12B via the biasing element—a torsional spring in the embodiment shown in FIG. 2.—rather than being connected directly to the rotatable shaft 8. Although, the momentum device may be described as connected to a rotatable member, this connection does not have to be a direct connection. A reference to the momentum device 14 being connected to a rotatable member includes any connection of the momentum device 14 by a biasing element 9 to any other portion of the flow meter 10 that is being driven by the torque provider 21. For example, although in the embodiment of FIG. 2 the momentum device 14 is directly connected to the rotatable shaft 8 via the biasing element 9, the connection shown in FIG. 2 may also be described as having the momentum device connected to a rotatable member because the rotatable members 12A and 12B are directly connected to the rotatable shaft 8 which is drive by the torque provider 21.

As shown in the embodiment in FIG. 2, an axis of rotation 24 runs from an upstream side 26 of the flow meter 10 to a downstream side 28 of the flow meter 10. In the illustrated embodiment, as shown by the rotational arrows, rotatable member 12A, rotatable member 12B, and the momentum device 14 are designed to rotate about the axis 24. However in other embodiments, the rotatable members and the momentum device 14 may dither back and forth about the axis 24. Depending on the embodiment, the rotatable members and the momentum device 14 may rotate continuously around the axis 24 or may rotate a certain number of degrees and then reverse direction and rotate back the other direction in a dithered fashion.

The rotation of the rotatable members 12A and 12B is a forced rotation and may be driven by any number of drive mechanisms or torque providers 21. As shown in FIG. 2, the rotatable members may be rigidly affixed to a shaft 8 that runs down the axis of rotation 24. In other embodiments, a driver motor exterior to the housing 11 may be the torque provider 21 and spin the rotatable members about the axis of rotation 24. The torque provider 21 may be a turbine such as in FIG. 2, an external motor, or any other drive mechanism suitable for rotating the shaft 8 and the rotatable members continuously or in an alternating dithering fashion back and forth.

In different embodiments, the torque provider 21 or drive system may be upstream or downstream of the momentum device 14. Preferably if a turbine is used, the turbine is located downstream of the momentum device 14. Locating the turbine or other drive system downstream of the momentum device 14 helps reduce any turbulence or swirl in the fluid that may be introduced by the drive mechanism. Turbulence and swirl my cause errors in the mass flow measurement and therefore, are undesirable. In certain embodiments such as the one shown in FIG. 2, the turbine may be integrated within the housing 11 of the flow meter 10. If the flow meter is within the housing 11, the turbine may be integrated into one of the rotatable members 12A or 12B. In other embodiments, the turbine my be located outside the housing 11 of the flow meter 10.

As shown in the exemplary example of FIG. 2, the rotatable members 12A and 12B may be directly connected to the torque provider 21. In other embodiments, the rotatable members may be connected to the torque provider 21 through a series of gears to allow the torque and speed of the rotation to be configured. In addition, the gear system may be adjustable to allow adjustment of the gear ratio after construction of the flow meter 10 and/or during operation.

In the embodiment shown in FIG. 2, rotatable member 12A is also designed to be a flow conditioner. A flow conditioner is used to condition the flow prior to entering the momentum device 14. In the embodiment shown in FIG. 2, the rotatable member 12A is in fixed rotation with the torque provider 21 and acts as a flow conditioner by causing the flow to rotate with the same angular speed as the momentum device 14 prior to the flow entering the momentum device 14. In the exemplary example of FIG. 2, the rotatable member 12A is caused to rotate because it is connected to the rotatable shaft 8 running along the axis 24. However, rotatable member 12A may be connected to rotatable member 12B and caused to rotate as one integrated piece connected to the shaft 8. Generally, rotatable member 12A and 12B may be designed as a single integrated piece.

In other embodiments, the flow conditioner may be separate from the rotatable members and may not be integrated into a rotatable member. In addition, the flow conditioner may be stationary or caused to rotate with the rotating components of the flow meter 10.

The momentum device 14 may be any device designed to measure the momentum of a fluid as it passes through the flow meter 10. For example, the momentum device 14 may be a momentum wheel. In the exemplary embodiment of FIG. 2, the momentum device 14 is completely enclosed by rotatable member 12A and rotatable member 12B. By completely enclosing the momentum device 14 with parts in fixed rotation, the exemplary embodiment reduces the shear forces experienced by the momentum device 14. In particular, the shear planes have been moved from the interfaces of the momentum device 14 to the external interfaces of components in fixed rotation with the drive mechanism.

A shear plane is defined as a plane or area between two adjacent components A and B of the flow meter 10 in which a change in a tangential velocity component of a fluid particle passing from A to B causes a shear force on either A or B. A shear plane will often occur between two adjacent components of the flow meter 10 that are not designed to rotate with the same speed when the flow meter 10 has reached a steady state condition. For example, a shear plane may exist along where the flow path 34 transitions from a stationary component to a component rotating around the axis of rotation 24. In the embodiment of FIG. 2, the shear planes are located on the downstream side of the rotatable member 12B, and the upstream side of the rotatable member 12A. Hence, the shear planes have been removed from the interfaces where the flow path 34 enters and exits the momentum device 14.

In addition, circumferential shear forces may be experienced on the sides of rotating components as they rotate around the axis of rotation if the sides of the rotating components are adjacent a stationary component. For example, circumferential shear forces may exist between the circumference of the rotatable member 12A and the housing 11. In an exemplary embodiment, the momentum device 14 may also be protected from circumferential shear forces. As shown in FIG. 2, the momentum device is completely enclosed in the cavity 18 and thus the sides of the momentum device 14 are protected from shearing forces that would otherwise be caused by the stationary walls of the housing 11.

Preferably, momentum device 14 is completely enclosed in a cavity 18 that rotates or dithers with the same speed as momentum device 14. However in other embodiments, momentum device 14 does not have to be completely enclosed. For example, rotatable member 12A may not wrap around and form cavity 18. Consequently, as the momentum device 14 rotates, the sides of the momentum device 14 may be subject to circumferential shear forces with the stationary wall of the housing 11. In an alternative embodiment where the momentum device 14 is not completely enclosed, the gap between the momentum device 14 and the walls of the housing 11 may be increased to reduce the circumferential shear forces acting on the sides of the momentum device 14.

In other embodiments, the shear planes may not be removed from both ends of the momentum device 14. For example, in some embodiments rotatable member 12A may not be a rotatable member and may be a stationary flow conditioner instead that does not rotate around the axis 24. Consequently, a shear plane would exist between the upstream side of the momentum device 14 and the flow conditioner. However, because the radius of the flow path 34 from the axis of rotation 24 is small at the transition the flow conditioner to the momentum device 14, a shear plane may not cause a large error in the mass measurement by the momentum device 14. Therefore in some embodiments, rotatable member 12A may be a stationary flow conditioner or absent all together.

The momentum device 14 includes a flow path 34 that determines the path of the fluid through the momentum device 14. One important aspect of the flow path 34 of the embodiments described herein, is that the flow path 34 changes the radial distance of the fluid from the axis of rotation 24 while the fluid is within the momentum device 14. The embodiment shown in FIG. 2 has a single flow path 34. The flow path 34 has a cylindrical cross section along the axis of rotation 24. The flow path 34 enters the momentum device 14 on the upstream side 26 with a small diameter and exits the momentum device 14 on the downstream side 28 with a larger diameter. The change in diameter, which increases the distance of the flow path 34 from the axis of rotation 24 within the momentum device 14, provides a number of benefits as will be discussed below.

In order to determine the mass of the fluid flowing through the mass flow meter 10, the momentum device 14 must add or subtract some measurable amount of angular momentum to the fluid. If the distance of the flow path 34 from the axis of rotation 24 is changed within the momentum device 14, the momentum device 14 may add or subtract angular momentum from the fluid without changing the relative angular speed of the momentum device 14 with respect to the other rotating components of the flow meter 10. The opposite is also true, and if the distance of the fluid path 34 from the axis of rotation 24 is not varied within the momentum device, the momentum device 14 must rotate at a different angular speed with respect to the other components in order to change the angular momentum of the fluid. If the momentum device 14 is rotating at a different speed relative to the surrounding components of the flow meter 10, shearing forces will be created at the interfaces of the momentum device 14. Shearing forces are dependent on viscosity and thus temperature and therefore when present at the interfaces of the momentum device, may add significant errors into the mass flow measurements, especially as the temperature fluctuates.

When the radial distance of the flow path 34 is changed within the momentum device 14, the principles of conservation of angular momentum allow angular momentum to be added or subtracted from the momentum device 14 while still keeping the momentum device 14 rotating at the same speed as the surrounding components.

In a system with no net torque, angular momentum in conserved. The angular momentum of a system is given by the equation:

$$\vec{L} = \vec{r} \times m\vec{v}$$

Where $\vec{L}$ is the angular momentum of the system, $\vec{r}$ is the position vector of the particle relative to the axis of rotation, and $m\vec{v}$ is the mass of the particle multiplied by the velocity ($m\vec{v}$ is equal to the linear momentum of the particle). Angular momentum is thus the cross product of the vector $\vec{r}$ and the linear momentum $m\vec{v}$. Angular momentum is conserved and therefore, $\vec{r}$ and $m\vec{v}$ have an inverse relationship.

For a system rotating with no net torque, as a particle gets farther from the axis of rotation, the particle's angular speed around the axis is reduced to conserve angular momentum. The inverse is also true and for a system rotating with no net torque, a particle's angular speed increases as the particle gets closer to the axis of rotation to conserve angular momentum. Conservation of angular momentum occurs all around us but may be easily observed in ice-skating. When an ice-skater spins and brings her arms in close to her body the ice-skater spins faster. When the ice-skater extends her arms away from her body she spins slower. The change in the ice-skaters angular speed when she adjusts the position of her arms is due to the conservation of angular momentum.

Applying the principles of angular momentum described above to the momentum device 14 of the flow meter 10, it is appreciated that a fluid rotating about an axis will rotate slower as the fluid moves farther from the axis of rotation. Inversely, the fluid will rotate faster as the fluid moves closer to the axis of rotation. For example, if a fluid with some existing rotational velocity enters the momentum device 14, and then flows outwardly away from the axis of rotation 24 while within the momentum device 14, the momentum device 14 will rotate slower. Accordingly, using a flow path 34 that varies in distance from the axis of rotation within the momentum device 14 allows angular momentum to be added or subtracted from the fluid by simply maintaining the rotational velocity of the momentum device 14 at a constant speed. This allows the momentum device 14 to rotate at the same relative speed as the surrounding components while still adding or subtracting angular momentum to the fluid. By maintaining the momentum device 14 and rotatable members 12A and 12B at the same angular speed, shear forces at the interface of the momentum device 14 are reduced or during steady state conditions, completely eliminated.

The basic operation of the mass flow meter 10 of FIG. 2 will now be described. Fluid enters the upstream side 26 of the housing 11 from an external line in which it is desired to know the mass flow rate of the fluid. The rotatable members 12A and 12B are rigidly affixed to the shaft 8 which is being driven by the torque provider 21—a turbine in the embodiment of FIG. 2. Rotatable member 12A acts as a rotating flow conditioner and the fluid begins to rotate with the same angular velocity as the rotatable member 12A as the fluid flows through rotatable member 12A. The fluid then enters the momentum device 14 with a fixed angular momentum. As the fluid is forced to move farther away from the axis of rotation 24 by the flow path 34 within the momentum device 14, the angular speed of the fluid volume would normally be reduced to conserve angular momentum. However, the momentum device 14 is affixed to the shaft 8 via a biasing element 9 and is forceably rotated. The momentum device 14 thus increases the angular momentum of the fluid while simultaneously maintaining the angular speed of the fluid about the axis of rotation 24. Although the fluid has maintained the same angular speed, its angular momentum has been increased by the momentum device 14.

The fluid subsequently leaves the momentum device 14 and enters the rotatable member 12B. Because the rotatable member 12B is also rigidly affixed to the shaft 8, the rotatable member 12B is also rotating with the same angular speed as the momentum device 14 and rotatable member 12A. Thus all three components, rotatable member 12A, rotatable member 12B and the momentum device 14 rotate with the same angular speed.

Although, the flow meter 10 still has shear planes, the novel design of the embodiment of FIG. 1 has moved the shear planes from the interface of the momentum device 14 to the exterior of the rotatable members 12A and 12B, which are rigidly affixed to the drive mechanism. Consequently in such embodiments, the shear forces are overcome by the drive mechanism and not by the momentum device 14 and its connecting spring. Therefore, in the steady state condition the flow meter 10 is less sensitive to shear forces and thus less susceptible to errors related to the viscosity and temperature of the fluid.

The absence of parts rotating at different speeds reduces or eliminates the shearing forces at the interfaces of the momentum device 14. Reducing or removing the shearing planes on the interfaces of the momentum device 14, reduces or eliminates the errors caused by the shear forces. The reduction in shear forces and their associated errors allows the mass flow meter 10 to more accurately calculate the mass of the flowing fluid, especially in variable temperature environments or for fluids with non-uniform viscosities.

The flow entering or exiting the momentum device may be conditioned to further increase the accuracy of the flow meter 10. Flow straighteners 30 and 32 may be added directly before and after the momentum device 14 to increase the uniformity of the flow entering and exiting the momentum device 14. In the embodiment of FIG. 2, the flow straighteners 30 and 32 are integrated into rotatable members 12A and 12B respectively and rotate with the same speed as the momentum device 14. However, the flow straighteners 30 and 32 may be separate parts and may not rotate. If flow straighteners 30 and 32 are separate parts, they may be driven by the same motor or gears as the rotatable members or may be driven by a separate drive system. For example, if the flow meter includes a shaft running down the axis of rotation 24 that is driven by an upstream or downstream turbine, the flow straighteners 30 and 32 may be rigidly affixed to the shaft to cause them to rotate in unison with the rotatable members and the momentum device 14. In embodiments where the flow straighteners do not rotate, they will not need to be connected to any part of the drive system. In addition, any number of flow straighteners may be used. Furthermore in other embodiments, more than one flow straightener may be used prior to or after the momentum device 14. In certain embodiments, flow straighteners may also be included in the pipe before or after entering the flow meter 10.

An important function of the flow straighteners 30 and 32 is to reduce or minimize swirl. Swirl is any additional currents in an axial flow, such as may be present after sharp bends or other obstacles in the flow path. A fluid flow that includes swirl has additional components of angular momentum which may add or subtract angular momentum to the fluid about the axis of rotation 24 of the flow meter 10. This additional angular momentum may introduce errors into the mass flow calculations. The flow straighteners 30 and 32 help reduce and minimize the swirl and turbulence prior to and after the fluid exits the momentum device 14 so that an accurate measurement of the angular momentum and thus mass flow rate may be made.

The flow straighteners 30 and 32 are shown in FIG. 1 as straight portions of the flow path 34 on the upstream and downstream sides of the momentum device 14. However, the flow straighteners may be any shape, size or length that helps reduce the swirl and turbulence of the fluid as it enters and exits the momentum device 14.

In addition to moving the shearing planes to the outside of the flow meter 10 and away from the momentum device 14, changing the radial distance of the flow path within the momentum device 14 has additional advantages. Because on the upstream side of the momentum device 14 the fluid enters close to the axis of rotation 24, any torque caused by the shear forces that still exist will be minimized by the very short distance (torque arm) between the area where the shear forces are occurring and the axis of rotation 24. Consequently, in embodiments with a flow conditioner that is not in fixed rotation or is absent all together, the torques created by the shear forces in the shear plane on the upstream side of the momentum device 14 are minimized.

Furthermore, because the radial distance from the axis of rotation 24 is increased within the momentum device 14, the torques caused by shear forces may be minimized while still allowing for a large input torque into the momentum device 14. Using a larger input torque to make the mass flow measurement reduces the relative significance of frictional errors and results in a less disturbance sensitive and more accurate mass flow measurement. The frictional torque may be approximated as follows: The shear stress $\tau$ in the plane of the entry section of the fluid into the momentum device 14 may be represented by the equation $$\tau = \mu * \frac{dv_t}{dx}$$

where $\mu$ is the dynamic viscosity and $$\frac{dv_t}{dx}$$

is the gradient of tangential velocity along the axis of the momentum device. The torque $T_s$ generated by the shear stress can be approximated with $T_s \approx A*\tau*r_1$ where $r_1$ is the mean entry radius and A is the entry area of the fluid at the momentum device 14. Finally with $v_t=r_1*\omega$ the undesirable torque due to the shear stress becomes $T_s \approx A*\mu*\omega*r_1^2$ The useful measurement torque $T_M$ is $T_M=\dot{m}*\omega*r_2^2$ where $r_2$ is the mean exit radius of the momentum device 14. This means that the rejection rate of the undesirable torque due to shear stress becomes $$\frac{T_M}{T_S} = \left(\frac{r_2}{r_1}\right)^2$$

This shows that massive rejection may be achieved by choosing the right relation between the inlet and exit radii of the momentum device 14.

While some important aspects of the flow path 34 with respect to a change in radial distance from the axis of rotation 24 have been described above, the flow path 34 through the momentum device 14 may take many possible shapes and include any number of paths. For example, the flow path 34 through the device may be made of several individual flow paths that branch out from a central flow path. The flow path 34 may be a ring of increasing or decreasing diameter. In certain embodiments, the flow path 34 may be made of multiple parallel paths. For example, the flow path 34 may be split into several parallel sections which are separated by radial vanes. The flow path 34 may be angled outward or inward or take any other path that changes the distance of the flow path 34 from the axis of rotation 24.

The exemplary embodiment of FIG. 2 illustrates a flow path 34 that increases in radial distance, an "inside out" flow path. Other flow path shapes that change in radial distance may be used. For example, an "outside in" flow path may be used. The reduction of the radial distance of the flow path in an "outside in" shape will cause the momentum device to speed up or lead the rotatable members rather than slow down or lag the rotatable members as caused by the "inside out" path. If an "outside in" flow path 34 is used, the mass flow meter 10 may measure the torque required to slow down the momentum device 14 to match the angular speed of the rotatable member 12B and surrounding parts. In general, any flow path or paths 34 may be used through the momentum device 14 that include(s) a change in radial distance from the axis of rotation. Furthermore, the angles and shape of the path(s) may be optimized to help reduce swirl and other turbulence that may be part of the fluid flow.

In addition, it may be advantageous for the flow path 34 to pass through certain components of the flow meter 10 while in other embodiments, it may be advantageous for the flow path 34 to pass around certain components. For example, having the flow path 34 pass through the rotatable member 12B allows for a compact design and may reduce the number of components required while still separating at least one shearing planes from the interface of the momentum device 14.

As discussed above, the momentum device 14 is preferably connected to the rotatable member 12B via a biasing element 9 such as a spring. However, the momentum device 14 may be connected to the mass flow meter 10 in a number of ways. If a spring is used, the spring constant, which is the measure of the force required for a particular deflection, needs to be carefully calibrated in order to allow the spring to accurately measure the torque imparted on the passing fluid as the momentum device 14 rotates.

As fluid flows through the mass flow meter 10 the rotatable members 12A and 12B are forceably caused to rotate by the turbine or other torque provider 21. The spring connecting the momentum device 14 to the rotatable member 12B, or other rotating component such as the shaft 8, forces the momentum device 14 to rotate with the rotatable member 12B. The forced rotation of the momentum device 14 via the spring at a certain angular speed will increase the angular momentum of the fluid as the flow path of the fluid increases in distance from the axis of rotation 24. The corresponding torque on the momentum device 14 as it adds angular momentum to the flowing fluid will cause the spring connecting the momentum device 14 to the rotatable member 12B to deflect. The deflection may be translated into a torque measurement by using the carefully calibrated spring constant.

Although a spring is preferably used as the biasing element 9 to connect the momentum device 14 to the rotatable member either 12A or 12B, any biasing element capable of being calibrated to indicate the torque on the momentum device 14 may be used. If a spring is used as the biasing element 9, different types of springs may be used. For example, a torsional spring, a spiral spring, a torsion bar, a compression spring, or an extension spring may be used to connect the momentum device 14 to the rotatable member 12B. In a preferred embodiment, the spring constant is adjustable to allow fine adjustments to the flow meter 10 to be made easily during the calibration process.

The momentum device 14 has to rotate freely around the axis of rotation 24. The momentum device 14 is constrained to the flow meter 10 by the biasing element 9 but should otherwise rotate freely about the axis of rotation 24. Friction due to the rotation of the momentum device 14 will contribute to any error in the mass flow calculations. To this end, in one exemplary embodiment the momentum device 14 is mounted on bearings around the axis of rotation 24. However, in other embodiments the momentum device 14 may be connected using other methods including ball or rolling bearings, magnetic bearings, sleeve bearings, jewel bearings, high pressure hydraulic bearings or any other type of low friction connection that will allow the momentum device 14 to rotate freely.

In embodiments using a relatively high spring constant leading to relatively small phase shift angles or in embodiments where the rotatable members and momentum device 14 are dithered instead of rotated completely around the axis of rotation 24, other methods of connecting the momentum device 14 may be used. For example, a flexion or pivot bearing may be used because of the limited angular deflection required.

The friction in the bearing is prevailingly responsible for hysteresis and depends on the mechanical load both axially and radially. Depending on the pressures involved, a hydraulic bearing may be used to allow the momentum device 14 to rotate freely around the axis of rotation 24. The axial load may be compensated by applying the same pressure at the back of the momentum device 14 as at the front of the momentum device 14.

In the preferred embodiment, the flow meter 10 is designed to allow small amounts of the liquid to purposely leak into areas between the momentum device 14 and the walls of the cavity 18 and/or shaft to form a hydraulic bearing. The "leak" would further serve to keep the pressure equal both radially and axially. In addition, in the preferred embodiment, liquid is allowed to leak into the chamber 13 formed between the housing 11 and internal components.

In another embodiment, a permanent magnet, such as a magnet bearing, is used to levitate the momentum device 14 around the axis of rotation 24. The levitation eliminates friction between the momentum device 14 and the rest of the flow meter 10. Furthermore, hysteresis may be reduced or removed by using the permanent magnet bearing.

As the momentum device 14 rotates around the axis of rotation 24 and the angular momentum of the liquid is increased accordingly, the spring connecting the momentum device is deflected. This deflection needs to be accurately measured in order to calculate the torque exerted on the momentum device 14 by the fluid. Once in the steady state condition, the momentum device 14 will rotate with the same speed as the rotatable members. However, due to the spring connection and the constant force the momentum device 14 must exert to change the angular momentum of the passing fluid, the momentum device 14 will lag or lead the rotation of the rotatable members. This phase shift in rotation may be measured to determine the deflection of the spring.

In the embodiment shown in FIG. 2, magnetic pickups are used to measure the phase shift in the rotation of the momentum device 14 and the rotatable member 12B. Magnetic pickups consist of a magnet 5 that travels in close proximity past a coiled wire 7. As the magnet 5 passes the coiled wire 7 a current is induced in the wire which may be measured as a signal. By placing a magnet 5 on both the rotating rotatable member 12B, and the rotating momentum device 14, the relative rotation of the rotatable member 12B to the momentum device 14 may be determined. As each magnet 5 mounted on either the rotatable member 12B or the momentum device 14 passes a coil, an electrical current is induced in the coil which may be monitored as a signal. The difference in time between when the rotatable member 12B passes the wire coil pickup 7 and when the momentum device 14 passes the wire coil pickup 7 is the phase shift needed to determine the spring deflection.

Although preferably the momentum device 14 and rotatable member 12B are used as the two rotating components for which a phase shift is determined as shown in FIG. 2, other components other than the rotatable member 12B may be used. In other embodiments, the phase shift may be measured between the momentum device 14 and any other component in fixed rotation. For example, the phase shift may be determined between the momentum device 14 and a rotatable shaft 8 or the rotatable member 12A. In such embodiments, the magnet 5 may be relocated from the rotatable member 12B to the other rotatable component. Other configurations of the magnets 5 and the wire coils 7 are also possible.

The magnets 5 may be configured on the momentum device 14 and rotatable members in numerous ways. For example, the magnets 5 could be configured on the exterior or interior of the flow meter 10. In addition, the magnets could each have their own coil wire pickup or could share a coil wire pickup 7. By reversing the orientation and thus polarity of one of the magnets 5 on either the momentum device 14 or the rotatable member 12B, a single coil pickup 7 sensor may be used for both the rotatable member 12B and the momentum device 14. As the magnets 5 with opposite orientation pass the coil pickup 7, a current will be induced in the opposite direction for each magnet 5. The reverse in the direction of the current may be used to distinguish the signal of the rotatable member 12B from the signal of the momentum device 14. Consequently, the two parts may share a single coil wire pickup 7. Reducing the number of coil pickups 7 reduces the number of parts, reduces cost, and increases reliability. In addition, the required wiring may be reduced. Other methods of detecting the spring deflection may also be used including capacitive, inductive, optical, or Eddy current based methods.

In another embodiment using the same principle as the magnetic pickups described above, magnets may be placed inside the coil wire pickups 7. Ferrite targets are then mounted on the rotating components instead of magnets. When the ferrite targets pass by the pickups 7, the magnetic flux in the pickups 7 will change and thereby induce a voltage in the coil that can be detected.

Similar to the materials available for use in the construction of the housing 11, the internal components, such as the rotatable members 12A and 12B and the momentum device 14, may be made out of any material appropriate for the fluid that will flow through them. For example, the internal components may be made from injection molded plastic, stainless steel or aluminum or any other suitable metal, plastic, ceramic or other material.

Figure 3:
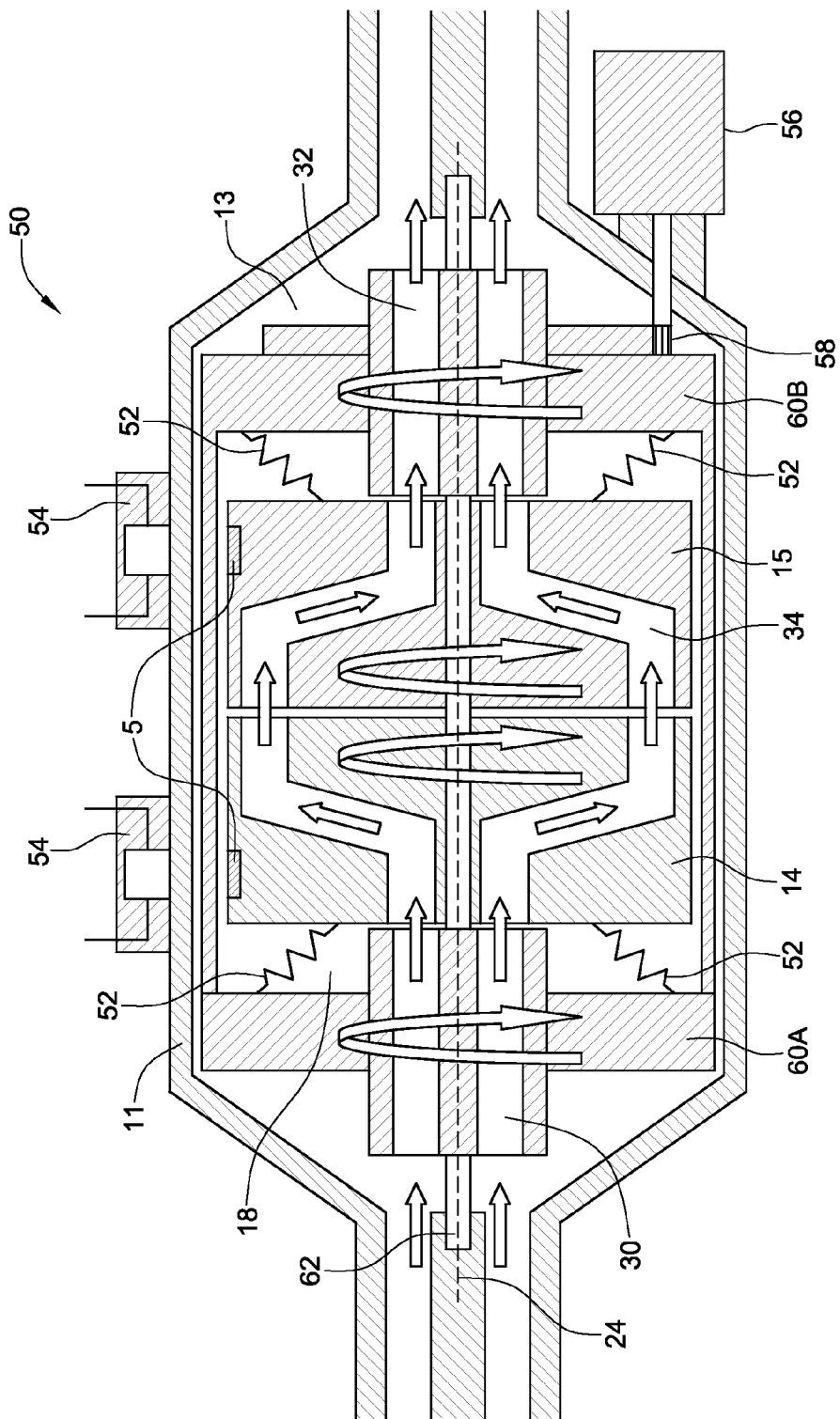
FIG. 3 illustrates a cross sectional view of an embodiment of a dithered flow meter with multiple momentum devices.

FIG. 3 illustrates a cross sectional view of an embodiment of a dithered mass flow meter 50. The mass flow meter 50 shown in FIG. 3 also includes an additional momentum device 15. Adding an additional momentum device 15 provides redundant measurements and helps calculate a more accurate mass flow reading. The torque outputs of the momentum devices 14 and 15 may be averaged or simply added or compared to increase the accuracy of the overall mass flow measurement. Although the embodiments of FIG. 2 and FIG. 3 show one momentum device and two momentum devices respectively, any number of momentum devices may be added to increase the torque, and thereby accuracy, or to provide redundant measurements.

An additional advantage of the embodiment of the flow meter 50 in FIG. 3 over the flow meter 10 in FIG. 2 is that the input and output diameters of the inlet and outlet of the flow path 34 passing through the momentum devices 14 and 15 are the same. As may be seen in FIG. 3, the first momentum device 14 increases the diameter of the flow path 34 and the second momentum device 15 returns the diameter of the flow path 34 to its original diameter. Keeping the inlet and outlet the same diameter is preferable because it allows the flow meter 50 to be placed directly inline within an existing pipe without further modification. However, adding an additional "outside in" momentum device is not required to return the flow path 34 to its input diameter. As shown in FIG. 2, Flow meter 10 may return the flow path 34 to its entry diameter within the housing 11 without adding an additional momentum device 15.

In other embodiments, additional momentum devices may be used without returning the flow path to its original diameter. For example, certain embodiment may include multiple momentum devices while still increasing or decreasing the exit diameter of the flow path 34 from the entry diameter of the flow path 34.

In addition to having an additional momentum device, the embodiment of the flow meter 50 in FIG. 3 differs from the embodiment of the flow meter 10 in FIG. 2 because the flow meter 50 is designed to dither around the axis of rotation 24 instead of rotating completely around it. Flow meter 50 includes rotatable members 60A and 60B. Rotatable members 60A and 60B integrate together to form cavity 18 in which momentum devices 14 and 15 are located. Rotatable members 60A and 60B have flow conditioners 30 and 32 integrated into them respectively.

Instead of being driven by a turbine and a rotating shaft, the flow meter 50 includes and external motor 56 as a torque provider. The external motor 56 drives the rotatable components via a gear system 58. The external motor 56 is designed to switch directions at periodic intervals causing the rotatable members 60A and 60B to dither back and forth on the fixed shaft 62. Momentum devices 14 and 15 are connected to the rotatable members 60A and 60B by four biasing elements 52. In the embodiment shown in FIG. 3, the biasing elements 52 are springs. As the rotatable members are dithered back and forth the momentum devices 14 and 15 are forced to follow the rotatable members via their connection via the biasing elements 52.

As the fluid flows through the flow meter 50, it enters the momentum device 14 at an initial radius r1 and exits the momentum device 14 at a larger radius r2. The change in the radius of the flow path 34 within the momentum device 14 causes the momentum device 14 to lag the rotatable members 60A and 60B. The fluid then enters the second momentum device 15 at radius r3 and exits the second momentum device 15 at a smaller radius r4. The reduction of the radius of the flow path 34 within the second momentum device 15 cause the momentum device to lead the rotatable members 60A and 60B.

As shown in the illustrated embodiment of FIG. 3, r1 is equal to r4 and r2 is equal to r3 resulting in no net change in the flow path radius as it passes through the flow meter 50. As explained above with respect to flow meter 10 in FIG. 2, other flow path designs are possible.

The rotating parts in flow meter 50 are driven by an external motor 56 and rotate around a fixed shaft 62. The rotating parts may be supported on the shaft by bearings or any other method of allowing the parts to rotate with as little friction as possible. As shown in the embodiment illustrated in FIG. 3, the integrated rotatable members 60A and 60B are supported on the shaft 62 via bearings located in the center and along the axis of the flow straightener portions 30 and 32 of the rotatable members 60A and 60B.

The flow meter embodied in FIG. 3 also uses Hall effect sensors 54 to determine the position of the momentum devices 14 and 15. The Hall effect sensors measure a change in magnetic field and may be used in combination with magnets 5 as one alternative to the wire coil pickups shown in the embodiment of FIG. 2. As the magnets dither back and forth the magnetic field sensed by the Hall effect sensor will change. The Hall effect sensor 54 will use the change in the magnetic field to determine the relative position of momentum devices 14 and 15.

As may also be seen by FIG. 3, when more than one momentum device is used, a magnet 5 may be placed on each momentum device rather than on a momentum device and a rotatable member as illustrated in the embodiment of FIG. 2. Because the design of the flow path 34 of flow meter 50 will cause momentum device 14 to lead the rotatable members and the momentum device 15 to lag the rotatable members, the relative difference between the momentum devices may be used to determine the mass flow rate via the Hall effect sensors 54.

Although the embodiment shown in FIG. 3 has some differences from the embodiment of FIG. 2, the embodiment of FIG. 3 still has a flow path 34 that passes through the momentum device and then enters rotatable members designed to remove a shear plane from the interface of the momentum device itself. To this end, the design elements of the embodiments shown in FIG. 2 and FIG. 3 are interchangeable. For example, an embodiment of a flow meter may use two momentum devices but rotate instead of dither. As another example, an embodiment of a flow meter may use a motor contained within the housing 11 or a turbine external to the housing 11.

Figure 4:
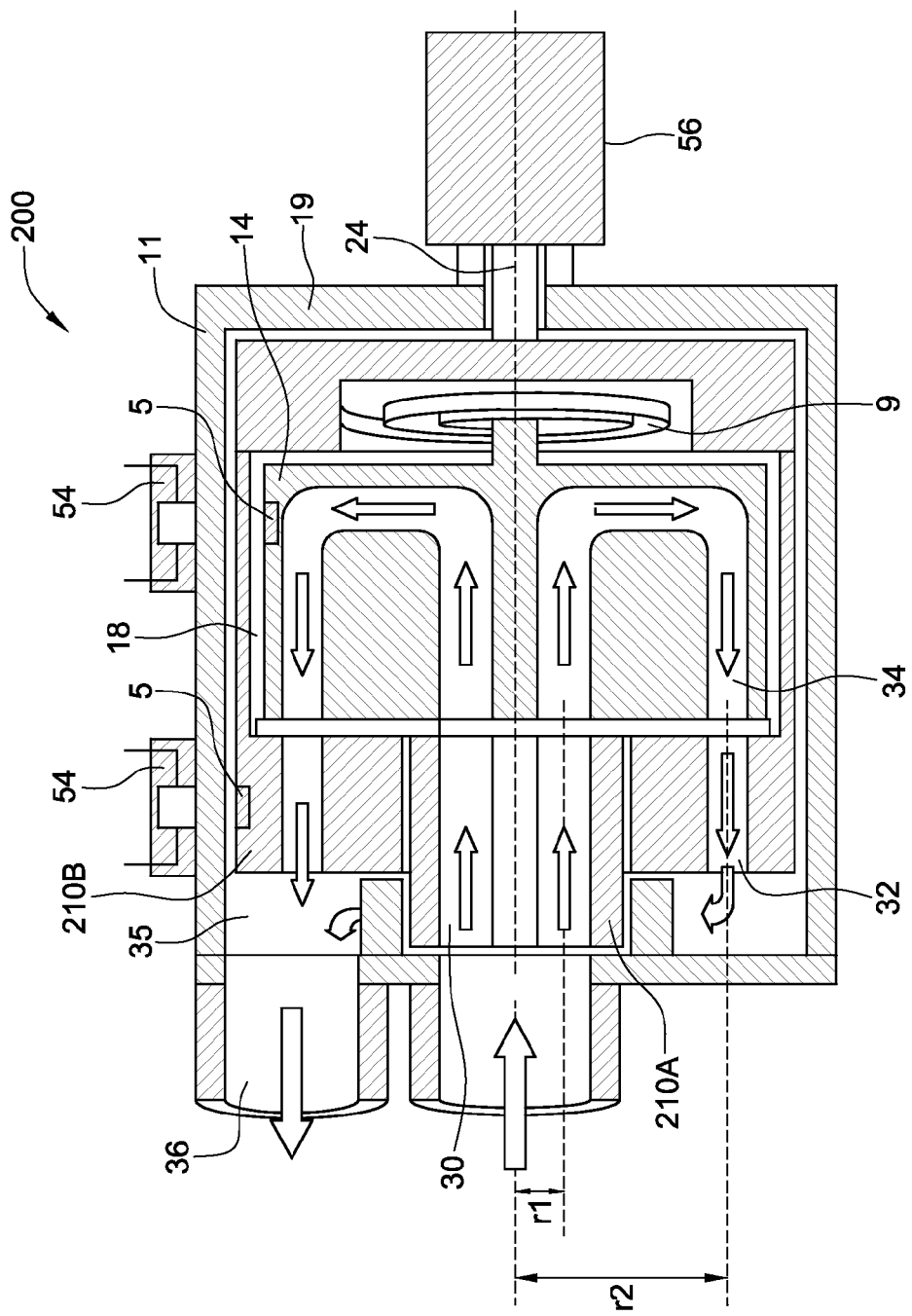
FIG. 4 illustrates a cross sectional view of an embodiment of a mass flow meter where the direction of flow is substantially reversed within the momentum device.

FIG. 4 illustrates a cross sectional view of an embodiment of a mass flow meter 200. The mass flow meter 200 is similar to mass flow meter 10 in FIG. 2 except that it includes a momentum device 14 on which the entry and exit of the flow path are on the same side. In the embodiment shown in FIG. 4, the general flow direction of the flow path 34 is substantially reversed within the momentum device 14.

In the embodiment shown in FIG. 4, the fluid enters at a radius r1 from the axis of rotation 24 and the fluid exits at a radius r2 from the axis of rotation 24. Both the fluid entrance and fluid exit are on the same side of the flow meter 200. Allowing the fluid to enter and exit the flow meter 200 on the same side allows the flow meter 200 to be installed in tight places where a flow meter that allows the fluid to pass through, such as flow meter 10 shown in FIG. 2, will not fit.

In addition, the design of flow meter 200 allows the torque provider to be more easily mounted on the exterior and provide the torque to a shaft running along the axis of rotation 24.

In the embodiment shown in FIG. 4, the torque provider is an external motor 56 mounted coaxially with the axis of rotation 24.

As shown in FIG. 4, despite the flow path being modified and the fluid entrance and exit being located on the same side of the flow meter, the internal components are similar to the embodiment of flow meter 10. Although some of the internal components may have slightly different dimensions to adapt for the different geometry, they have the same function as described in the detailed description of flow meter 10.

The fluid enters the mass flow meter 200 through rotatable member 210B before it enters the momentum device 14 at a radius r1 from the axis of rotation 24. In a preferred embodiment of the mass flow meter 200, the rotatable member 210A will be connected to the rotatable member 210B and will be rotating together with the rotatable member 210B. However in another embodiment of mass flow meter 200, the rotatable member 210A may just be fixed to the housing near the fluid inlet and will be stationary. In yet another embodiment, the rotatable member 210A may be omitted completely and the fluid enters directly into the momentum device 14.

Similar to other embodiments of flow meters described herein, the rotatable members 210A and 210B may have flow conditioners 30 and 32 integrated into them respectively. In some embodiments the flow conditioners may be flow straighteners.

Also similar to other embodiments described herein, the fluid will be transferred from radius r1 to radius r2 within the rotating momentum device 14, thereby changing the fluid's angular momentum. In the embodiment shown in FIG. 4, the fluid exits the momentum device 14 at radius r2 and enters the rotatable member 210B. The rotatable member 210B is shaped to form the cavity 18. The additional cover plate 19 closes the cavity 18 to close out the shear plane between the momentum device 14 and the housing 11. After exiting the rotatable member 210B, the fluid enters a ring channel 35. The ring channel 35 collects all the fluid and leads it to the fluid outlet 36.

As shown in FIG. 4, in the preferred embodiment of mass flow meter 200, the fluid outlet 36 is situated on the same side of the housing 11 as the fluid inlet. In other mass flow meter embodiments, the fluid outlet 36 may be on the circumference of the housing 11 and lead radially outward from the ring channel 35.

Although the fluid is shown entering and exiting on the same side of the flow meter 200 at radii r1 and r2 in FIG. 4, other configurations for the entry and exit are possible while still including a momentum device 14 that substantially reverses the direction of the flow path 34. For example, the flow path might still allow the fluid to pass through the flow meter despite flowing through a momentum device 14 that substantially changes the direction of the fluid flow. In yet another embodiment, more than one momentum device 14 that substantially reverses the direction of the fluid flow may be used in combination within the same flow meter. Furthermore, the fluid entrance and exit may be on sides that are oriented ninety degrees from each other. In general, the fluid path 34 may be designed to allow the fluid entrance and exit to be on any side of the flow meter. Momentum devices that either substantially reverse the flow, allow the flow to pass through, and combinations thereof, may be incorporated to create various flow paths and various fluid entrance and exit locations.

One difference in the embodiment of the flow meter 200 in FIG. 4 from the embodiment of flow meter 10 in FIG. 2, is that the flow path exits the housing in general terms on the same side as the flow path enters the housing. Often the mass flow meter is mounted on the exterior of a hydraulic unit, such as the fuel metering unit 100 shown in FIG. 1., from which the fluid comes from and to which the fluid must return again. The advantage of the mass flow meter 200 is that it can be mounted directly on the hydraulic unit without additional pipe work.

One advantage of the embodiment of the flow meter 200 in FIG. 4, is that the overall length of the mass flow meter may be substantially reduced. In certain embodiments, the overall length of the mass flow meter that reverses the direction of the fluid flow may be reduced to about half the length of the mass flow meter that allows the fluid to pass through. The overall weight may be reduced accordingly.

Because the housing 11 has to withstand the fluid pressure, the walls of the housing 11 may be required to have a substantial thickness when the specified static pressure is high. The weight of the housing is therefore predominant in many cases. The possible reduction in length may therefore allow the weight of the mass flow meter to be reduced by almost half.

Figure 5:
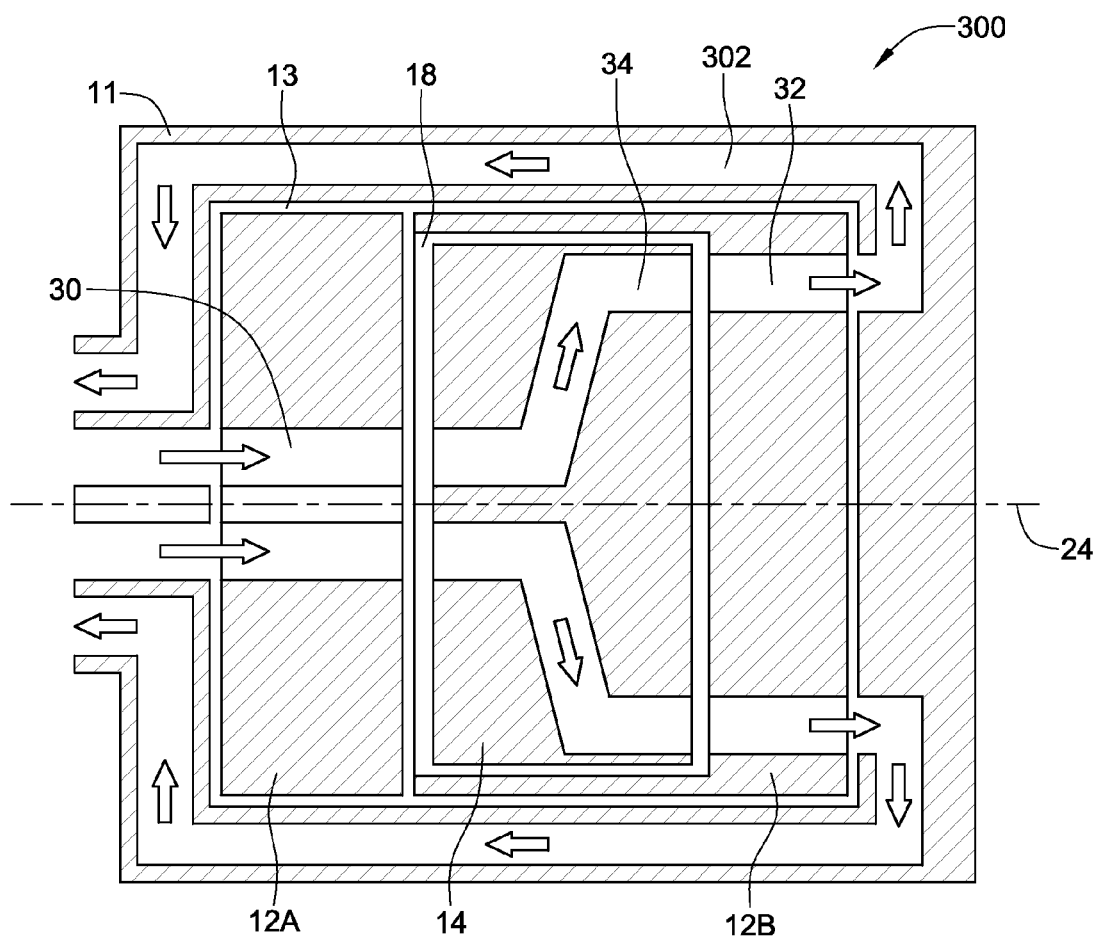
FIG. 5 illustrates a cross sectional view of an embodiment of a flow meter in which the flow path enters and exits the flow meter on the same side.

FIG. 5 illustrates a cross sectional view of an embodiment of a mass flow meter 300 in which the flow path enters and exits the flow meter on the same side. However, the embodiment shown in FIG. 5 does not use a momentum device that substantially reverses the direction of the fluid flow. Instead the fluid flow is reversed within the housing 11. In general, different embodiments of the flow meter may be designed to allow the fluid to enter and exit the flow meter on any side and in any combination. In the embodiment shown in FIG. 5, the fluid exits the rotatable member 12 and enters into the housing 11 where the flow path 302 directs the fluid back around the flow meter to the same side it entered on.

Although the embodiments have been described with reference to preferred configurations and specific examples, it will readily be appreciated by those skilled in the art that many modifications and adaptations of the apparatus and methods for measuring a mass flow described herein are possible without departure from the spirit and scope of the embodiments as claimed hereinafter. Thus, it is to be clearly understood that this description is made only by way of example and not as a limitation on the scope of the embodiments as claimed below.

What is claimed is:

1. A mass flow meter comprising:
   a housing including a fluid inlet and a fluid outlet, wherein the housing defines a chamber therein;
   a rotatable member arranged in the chamber and rotatable about an axis;
   a momentum device arranged in the chamber and connected to the rotatable member via a biasing element so as to be rotatable about the axis and rotatable relative to the rotatable member; and
   a fluid path in fluid communication with the fluid inlet and the fluid outlet, wherein the fluid path passes through both the rotatable member and the momentum device, and wherein the fluid path enters the momentum device at a radial distance r1 from the axis and exits the momentum device at a radial distance r2 from the axis, and wherein r1 and r2 are different distances.

2. The mass flow meter of claim 1, further comprising:
   a second momentum device arranged in the chamber and connected to the rotatable member via a biasing element so as to be rotatable about the axis and rotatable relative to the rotatable member; and
   wherein the fluid path passes through the second momentum device, and wherein the fluid path enters the second momentum device at a radial distance r3 from the axis and exits the second momentum device at a radial distance r4 from the axis, wherein r3 and r4 are different distances.

3. The mass flow meter of claim 1, further comprising a flow straightener contained within the chamber, wherein a portion of the fluid path between the fluid inlet and the momentum device is defined by the flow straightener.

4. The mass flow meter of claim 3, wherein the flow straightener is designed to be in fixed rotation with the rotatable member.

5. The mass flow meter of claim 1, wherein at least a portion of the fluid path within the rotatable member is designed to be a flow straightener.

6. The mass flow meter of claim 1, wherein the rotatable member defines a second chamber and the momentum device is contained within the second chamber.

7. The mass flow meter of claim 1, further comprising a rotatable shaft running along the axis.

8. The mass flow meter of claim 1, further comprising a torque provider coupled to the rotatable member.

9. The mass flow meter of claim 7, further comprising a torque provider coupled to the rotatable member via the rotatable shaft.

10. The mass flow meter of claim 1, wherein the biasing element is a torsional spring.

11. The mass flow meter of claim 8, wherein the torque provider is a turbine.

12. The mass flow meter of claim 8, wherein the torque provider is a motor.

13. The mass flow meter of claim 1, wherein r1 is smaller than r2.

14. The mass flow meter of claim 8, wherein the rotatable member and the momentum device are designed to be continuously driven in a same rotational direction by the torque provider.

15. The mass flow meter of claim 8, wherein the rotatable member and the momentum device are designed to be dithered back and forth by the torque provider.

16. The mass flow meter of claim 1, further comprising a sensor arranged to measure the deflection of the biasing element.

17. The mass flow meter of claim 16, wherein the sensor measures the deflection of the biasing element by determining a phase difference between the rotation of the momentum device and the rotation of the rotatable member.

18. The mass flow meter of claim 1, further comprising a sensor arranged to measure a angular speed of the momentum device.

19. The mass flow meter of claim 1, further comprising a sensor arranged to measure a torque between the momentum device and the rotatable member.

20. The mass flow meter of claim 16, wherein the sensor is further arranged to also measure the angular speed of the momentum device.

21. The mass flow meter of claim 1, wherein the fluid enters and exits the momentum device on a same side of the momentum device.

22. A mass flow meter comprising:
a housing defining a chamber therein, the housing having a fluid inlet and a fluid outlet;
a rotatable member arranged in the chamber to be rotatable about an axis;
a momentum device arranged in the chamber so as to be rotatable about the axis and rotatable relative to the rotatable member, wherein the momentum device is in interaction with the rotatable member via an element capable of transmitting a torque between the rotatable member and the momentum device; and
a fluid path passing through the housing from the fluid inlet to the fluid outlet, wherein the fluid path includes a first portion defined within the momentum device and a second portion defined within the rotatable member, and wherein the first portion has a fluid entry at a radial distance r1 from the axis and a fluid exit at a radial distance r2 from the axis, and wherein r1 and r2 are different distances.

23. The mass flow meter of claim 22, wherein the fluid entry and the fluid exit are on a same side of the momentum device.

24. The mass flow meter of claim 22, wherein a flow direction of the fluid path is substantially reversed within the momentum device.

25. The mass flow meter of claim 22, wherein the fluid inlet and the fluid outlet are on a same side of the housing.

26. The mass flow meter of claim 22, wherein r2 is greater than r1.

27. The mass flow meter of claim 22, further comprising a second momentum device connected to the rotatable member via a biasing element so as to be rotatable about the axis and rotatable relative to the rotatable member, and wherein the fluid path further includes a third portion defined within the second momentum device, and wherein the third portion has a fluid entry at a radial distance r3 from the axis and a fluid exit at a radial distance r4 from the axis, and wherein r3 and r4 are different distances.

28. The mass flow meter of claim 27, wherein the change in the radial distance between r1 and r2 is substantially equal in magnitude and opposite in direction to the change in the radial distance between r3 and r4.

29. The mass flow meter of claim 22, further comprising a sensor arranged to measure a rotational phase difference between the rotatable member and the momentum device.

30. A mass flow meter comprising:
a housing including a fluid inlet and fluid outlet, wherein the housing defines a chamber therein;
a fluid path from the fluid inlet to the fluid outlet;
a rotatable member arranged in the chamber and rotatable about an axis;
a momentum device arranged in the chamber and connected to the rotatable member via a biasing element so as to be rotatable about the axis and rotatable relative to the rotatable member, wherein the fluid path traverses the momentum device from a fluid entry to a fluid exit; and
wherein the mass flow meter is designed to remove a shear plane at the fluid entry and fluid exit when the momentum device and rotatable member are rotated about the axis; and
wherein, during steady state operation of the mass flow meter, the angular velocity of at least a portion of the fluid path immediately upstream of the momentum device and at least a portion of fluid path immediately downstream of the momentum device is the same as the angular velocity of the portion of the fluid path that traverses the momentum device.

31. A mass flow meter comprising:
a housing including a fluid inlet and fluid outlet, wherein the housing defines a chamber therein;
a fluid path from the fluid inlet to the fluid outlet;
a rotatable member arranged in the chamber and rotatable about an axis;
a momentum device arranged in the chamber and connected to the rotatable member via a biasing element so as to be rotatable about the axis and rotatable relative to the rotatable member, wherein the fluid path traverses the momentum device from a fluid entry to a fluid exit; and wherein the mass flow meter is designed to remove a shear plane at the fluid entry and fluid exit when the momentum device and rotatable member are rotated about the axis; and wherein the fluid entry is at a radial distance r1 from the axis and the fluid exit is at a radial distance r2 from the axis, and wherein r1 is substantially different from r2.

32. A mass flow meter comprising:

a housing including a fluid inlet and a fluid outlet, wherein the housing defines a chamber therein;

a rotatable member arranged in the chamber and rotatable about an axis;

a momentum device arranged in the chamber and connected to the rotatable member via a biasing element so as to be rotatable about the axis and rotatable relative to the rotatable member; and a fluid path in fluid communication with the fluid inlet and the fluid outlet, wherein the fluid path enters the momentum device at a radial distance r1 from the axis and exits the momentum device at a radial distance r2 from the axis, and wherein r1 and r2 are different distances, and wherein the direction of the fluid path is substantially reversed within the momentum device.

33. A mass flow meter comprising:

a rotatable member arranged to be rotatable about an axis;

a momentum device arranged to be rotatable about the axis and rotatable relative to the rotatable member and in interaction with the rotatable member via an element capable of transmitting a torque between the rotatable member and the momentum device;

a fluid path passing through the momentum device wherein the fluid path enters the momentum device at a radial distance r1 from the axis on a first side and exits the momentum device at a radial distance r2 from the axis on the first side, and wherein r1 and r2 are different distances; and a means to determine the angular momentum which the fluid is exerting on the momentum device.

34. A fuel management system including a flow meter comprising:

a housing including a fluid inlet and a fluid outlet, wherein the housing defines a chamber therein;

a rotatable member arranged in the chamber and rotatable about an axis;

a momentum device arranged in the chamber and connected to the rotatable member via a biasing element so as to be rotatable about the axis and rotatable relative to the rotatable member; and a fluid path in fluid communication with the fluid inlet and the fluid outlet, wherein the fluid path passes through both the rotatable member and the momentum device, and wherein the fluid path enters the momentum device at a radial distance r1 from the axis and exits the momentum device at a radial distance r2 from the axis, and wherein r1 and r2 are different distances.

* * * * *

UNITED STATES PATENT AND TRADEMARK OFFICE
CERTIFICATE OF CORRECTION

PATENT NO. : 8,353,221 B2  
APPLICATION NO. : 13/010560  
DATED : January 15, 2013  
INVENTOR(S) : Felix E. Schmid Page 1 of 1

It is certified that error appears in the above-identified patent and that said Letters Patent is hereby corrected as shown below:

Title Page, Item (75) Inventor: Please delete "Felix Ernst Schmid, Brig (CH)" and replace with --Felix Ernst Schmid, Belfaux (CH)--.

Title Page, Item (73) Assignee: Please delete "Meggit S.A., Fribourg (CH)" and replace with --Meggitt S.A., Fribourg (CH)--.

In the Specification:

At column 5, line number 7, the word "provide" should read --provided--.

At column 6, line number 49, "FIG. 1" should read --FIG. 2--.

At column 12, line number 20, "FIG. 1" should read --FIG. 2--.

At column 13, line number 10, "FIG. 1" should read --FIG. 2--.

Signed and Sealed this  
Second Day of July, 2013

Teresa Stanek Rea  
*Acting Director of the United States Patent and Trademark Office*